United States Patent Office 3,375,244
Patented Mar. 26, 1968

3,375,244
PRODUCTION OF 5'-NUCLEOTIDES
Shunji Ouchi, Tsuneo Sowa, Hiraku Yamada, and Kozo Tsunoda, Tokyo, Masakazu Kurihara, Warabi-shi, and Saburo Senoo, Tokyo, Japan, assignors to Asahi Kasei Kogyo Kabushiki Kaisha, Osaka, Japan, a corporation of Japan
No Drawing. Filed Dec. 14, 1964, Ser. No. 418,331
Claims priority, application Japan, Dec. 19, 1963, 38/68,101
6 Claims. (Cl. 260—211.5)

The present invention relates to a process for the production of 5'-nucleotides (nucleoside-5' monophosphates) having the general formula

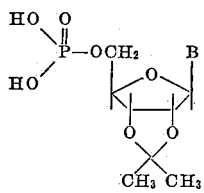

(I)

and having the 2' and 3' position protected, by reacting a 2',3'-O-isopropylidene-nucleoside having the general formula

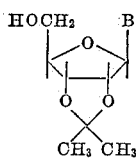

(II)

with phosphorous oxychloride in a mixture consisting of neutral and polar organic solvents and a small amount of a tertiary amine (wherein B represents purines and pyrimidines which compose nucleic acids).

The nucleotides represented by structural Formula I above are intermediates in the production process of 5'-nucleotides having the general formula

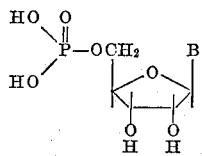

(III)

It is well known that the 2',3'-O-isopropylidene-nucleoside-5' monophosphate (I) obtained by the above-mentioned process is hydrolyzed under suitably acidic conditions to give free 5'-nucleotides (III). Of these, purine nucleotides are useful as condiments, while pyrimidine nucleotides are utilized as medical supplies.

It has also been known to produce 5'-nucleotides by subjecting a nucleoside to phosphorylation using phosphorous oxychloride. Namely, Levene and Tipson (page 313, volume 111 of Journal of Biological Chemistry, 1935) obtained 5'-inosinic acid by carrying out the phosphorylation with phosphorous oxychloride, using a large amount of pyridine as a solvent. In the same manner, Michelson and Todd (page 2476 of Journal of Chemical Society, 1949) obtained 5'-guanylic acid or the like. These processes, however, are not suitable for application on an industrial scale, because costly pyridine is required in a large amount, and the use of a large amount of pyridine necessitates carrying out the reaction at as low a temperature as −20° C., and furthermore the yield of 5'-nucleotides is as low as from 20 to 30%.

In the present invention, the reaction between a protected nucleoside and phosphorous oxychloride can be carried out quantitatively by employing polar and neutral organic solvents, instead of basic solvents, and by controlling the reaction by virtue of the addition of a small amount of an organic base to the reaction mixture, as a consequence of which 5'-nucleotides can be produced in high yield.

The organic solvents used in the present invention are required only to be capable of suspending a raw material nucleoside and of dissolving the nucleotide (having the general Formula IV produced therein.

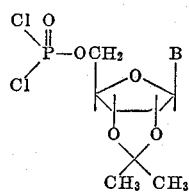

(IV)

Particularly excellent organic solvents include acetonitrile, nitromethane, tetrahydrofurane and dichloromethane. These organic solvents are used in an amount not greater than 5 liters per mol of the raw material nucleoside and most preferably in the vicinity of 1 liter per mol.

The phosphorous oxychloride is used as a phosphorylating agent, in an amount, most preferably, from 1.5 to 3.0 mols per mol of the raw material nucleoside. An amount less than 1.5 mol will result in an excessively low yield of 5'-nucleotides, while an amount more than 3.0 mols will not bring about any better yield and thus is meaningless.

In operating the present process, the rate of reaction can be controlled (i.e. catalyzed) by the use of a base in a small amount. The base may be in either a liquid or solid state. Any tertiary amine may be used, and pyridine, in particular, will produce good results. The amount of base used has a bearing on the rate of reaction but has substantially no bearing on the yield of nucleotides. Nevertheless, the base is used most preferably in equimolar amounts with the raw material nucleoside (II) but in any event, it is preferable that the amount of the base does not exceed that of phosphorous oxychloride in molar ratio. When the amount of the base is larger than that of phosphorous oxychloride in molar ratio, not only will the rate of reaction be accelerated markedly but concurrently side reaction will occur, and in order to check the side reactions, the reaction temperature must be lowered considerably.

The desired phosphorylation reaction of a mixture, in the above-described mixture ratio, will take place completely at a temperature from −10° to 30° C. The reaction time required will be from 30 minutes to 4 hours.

The fact that the organic solvents used in the present invention exhibit an excellent solvent effect in the reaction between a 2',3'-O-isopropylidenenucleoside and phosphorous oxychloride, has not been known. By the use of these solvents, it is possible to carry out the reaction quantitatively at about room temperature, at which temperature the reaction can be easily controlled. Moreover, by employing a base, in a suitable amount, as a catalyst, the reaction conditions, i.e., reaction temperature and reaction time, can be properly controlled.

Still further, in comparing with the conventional process wherein a basic solvent, such as pyridine, is used, the present process has several advantages in respect to the recovery of the solvent used. Namely, in the case where the phosphorylation reaction is carried out using phosphorous oxychloride, it must be followed by a reaction as shown by the equation below after blending the phosphorylation mixture with water.

(a)

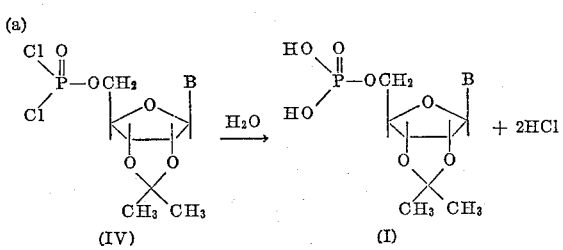

In the conventional process using a basic solvent, the solvent is recovered by adding to the aqueous solution, after the aforementioned reaction, the hydrogen chloride generated by the reaction and more than an equivalent amount of sodium hydroxide, with subsequent distillation. Thereafter, an acid, such as hydrochloric acid, is added to the residual solution, after the recovery of basic solvent, in order to obtain free nucleotides by the reaction (b)

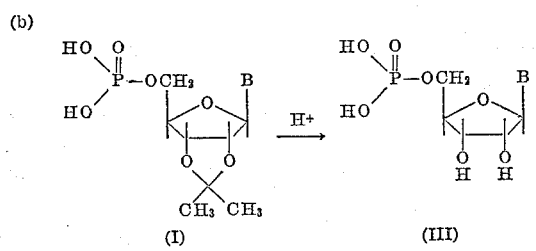

These additional steps represent nothing more than an irrational consumption of acids and alkali. In the process of the present invention, on the other hand, since the amount of base used is small, the aqueous solution (the solution obtained from reaction (a)), after the phosphorylation reaction, is acidic and it is therefore possible to carry out the hydrolysis of 2',3'-O-isopropylidene group (reaction Equation (b)) with the solution as it is (or with the addition of a small amount of alkali thereto). The recovery of solvent, if it is necessary, is effected conveniently either concurrently with or subsequent to the separation and refining of nucleotides (III).

The aqueous solution resulting from the hydrolysis of isopropylidene group, will contain more than 95% of 5'-nucleotide, no matter which nucleoside (II) is used as a starting raw material. The 5'-nucleotide can be easily separated from the aqueous solution by known methods, such as, for instance, absorption on active charcoal, or by separation in the form of heavy metal salts.

The present invention will be explained in further detail by way of the examples below:

Example 1

Twenty milliliters of acetonitrile, 1.6 g. (20 mM.) of pyridine and 9.0 g. (ca. 60 mmol.) of phosphorous oxychloride were admixed and maintained at 0° to 5° C., to which mixture 6.5 g. (20 mmol.) of 2',3'-O-isopropylideneguanosine was added with stirring. One hour later, the reaction solution was poured into about 500 ml. of ice-water. This aqueous solution (2',3'-O-isopropylidene-5' monophosphate having a selectivity of 95%) was then added with an aqueous solution of sodium hydroxide, thereby to adjust the pH at from 2.0 to 2.5, and heated for one hour at 70° to 80° C. whereupon isopropylidene group was hydrolyzed. To the resultant aqueous solution was added 35 g. of active charcoal with stirring, the solution was filtered and washed with water. The residual active charcoal was suspended in 300 ml. of 2.8% ammonia 10% ethanol solution and, after stirring, filtered. The filtrate was dried under vacuum to obtain ammonium 5'-guanylate. This was in the weight of 6.5 g. (90%) on the basis of free 5'-guanylic acid.

Example 2

An experiment was conducted in the same condition as in Example 1, except using 25 ml. of dichloromethane instead of acetonitrile, with 6.2 g. (85%) of 5'-guanylic acid produced.

Example 3

Forty milliliters of acetonitrile, 18 g. of phosphorous oxychloride and 3.2 g. of pyridine were admixed and maintained at from 0° to 2° C., to which 12.5 g. of 2',3'-O-isopropylideneinosine was added with stirring. About one hour later, the reaction mixture was poured into one liter of ice-water and the pH was adjusted to 1.5 by the addition of sodium hydroxide solution. This aqueous solution was then heated at 55° C. for 2 hours to effect the hydrolysis of isopropylidene groups. After the completion of hydrolysis, about 60 g. of active charcoal was added to the solution, which was stirred for several hours and filtered. The residual active charcoal was mixed with about 600 ml. of 3% ammonium 10% ethanol solution and, after stirring, filtered. The filtrate was dried under vacuum and, after removing ethanol ammonium, added to a suitable amount of water. This aqueous solution was then passed through a cation exchange resin (H-form) and the effluent was added to a sodium hydroxide solution to adjust the pH at 7.7, with subsequent concentration until it becomes a syrup. An organic solvent was added to the syrup thus prepared and allowed to cool, whereupon needle-shaped crystals were obtained. Upon filtering and drying the residue, 14.4 g. (92%) of disodium 5'-inosinate was obtained.

Example 4

A mixture solution comprising 40 ml. of nitromethane, 15 g. of phosphorous oxychloride, and 4.0 g. of pyridine, was maintained at from 0° to 5° C. and added to 12.5 g. of 2',3'-O-isopropylidene inosine with stirring. About 30 minutes later, the reaction mixture was poured into 800 ml. of ice-water. The aqueous solution obtained after the removal of nitromethane separated out at the bottom of the vessel, was processed in the same manner as in Example 3, whereupon 14.2 g. (90.5%) of disodium 5'-inosinate was obtained.

Example 5

An experiment was conducted under the same conditions as in Example 3, except using 12.3 g. of 2',3'-O-isopropylidene adenosine instead of 2',3'-O-isopropylidene inosine, with 12.8 g. (84%) of disodium 5'-adenylate produced.

Example 6

Fifteen milliliters of acetonitrile, 3.0 g. of phosphorous oxychloride and 1.2 g. of pyridine were admixed and maintained at 5° C., to which 2.9 g. of 2',3'-O-isopropylidene uridine was added with stirring. After stirring for about one hour, the reaction mixture was poured into 500 ml. of ice-water, followed by the same operation as in Example 3. As a result, 3.2 g. (86%) of sodium 5'-uridylate was obtained.

Example 7

Twenty milliliters of tetrahydrofuran, 9 g. of phosphorous oxychloride and 1.6 g. of pyridine were admixed and maintained at 5° C., to which 6.2 g. of 2',3'-O-isopropylidene inosine was added with stirring. After stirring for one hour, the reaction mixture was poured into 500 ml. of cold-water. The aqueous solution was subjected to the same process as in Example 3 and 6.6 g. (84%) of disodium 5'-inosinate was obtained.

What is claimed is:

1. A process for the production of 5'-nucleotides having the general formula

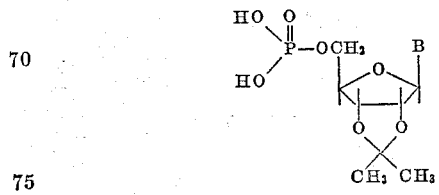

and protected by 2',3'-O-isopropylidene group, said process comprising reacting a nucleoside having the general formula

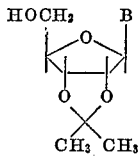

and protected by 2',3'-O-isopropylidene group and phosphorous oxychloride in mixture with a small amount of a tertiary amine as a catalyst and an organic solvent selected from the group consisting of acetonitrile, nitromethane, dichloromethane and tetrahydrofuran, wherein B is selected from the group consisting of purines and pyrimidines which compose nucleic acid.

2. The process as claimed in claim 1, in which the amount of organic solvent is not larger than 5 liters per mol of raw material nucleoside.

3. The process as claimed in claim 1, in which the molar amount of phosphorous oxychloride is not less than 1.5 times the amount of the raw material nucleoside.

4. The process as claimed in claim 1, in which the amount of tertiary amine is not greater than that of phosphorous oxychloride in molar ratio.

5. The process as claimed in claim 1, in which the reaction temperature is from $-10°$ to $+30°$ C.

6. The process as claimed in claim 1, in which the 5'-nucleotides having a protected group produced may be hydrolyzed into free 5'-nucleotides at 2',3' position.

References Cited

UNITED STATES PATENTS

| | | | |
|---|---|---|---|
| 3,138,582 | 6/1964 | Wittreich et al. | 260—211.5 |
| 3,201,388 | 8/1965 | Tsuchiya et al. | 260—211.5 |
| 3,201,389 | 8/1965 | Fujimoto et al. | 260—211.5 |

LEWIS GOTTS, *Primary Examiner.*

ELBERT L. ROBERTS, *Examiner.*

J. R. BROWN, *Assistant Examiner.*